(12) United States Patent
Li et al.

(10) Patent No.: US 11,643,322 B2
(45) Date of Patent: May 9, 2023

(54) MAINTENANCE BASE STATION AND CLEANING ROBOT SYSTEM

(71) Applicant: SHENZHEN FLY RODENT DYNAMICS INTELLIGENT TECHNOLOGY CO., LTD., Shenzhen (CN)

(72) Inventors: Jun Li, Shenzhen (CN); Linlin Zhou, Shenzhen (CN)

(73) Assignee: Shenzhen Fly Rodent Dynamics Intelligent Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/643,659

(22) Filed: Dec. 10, 2021

(65) Prior Publication Data
US 2022/0250899 A1    Aug. 11, 2022

(30) Foreign Application Priority Data
Feb. 5, 2021 (CN) .......................... 202110163492.6

(51) Int. Cl.
*B67D 7/02* (2010.01)
*B67D 7/78* (2010.01)
*B60S 5/00* (2006.01)

(52) U.S. Cl.
CPC .............. *B67D 7/0294* (2013.01); *B60S 5/00* (2013.01); *B67D 7/78* (2013.01)

(58) Field of Classification Search
CPC ............ B67D 7/0294; B67D 7/78; B60S 5/00
USPC ....................................................... 141/103
See application file for complete search history.

(56) References Cited

U.S. PATENT DOCUMENTS

| 3,804,297 | A | * | 4/1974 | Jurjans | .................. D06F 39/022 68/12.22 |
| 4,915,119 | A | * | 4/1990 | Franklin | ................. B08B 9/093 134/96.1 |
| 5,799,833 | A | * | 9/1998 | Green | ..................... B67D 7/78 222/484 |

(Continued)

FOREIGN PATENT DOCUMENTS

| CN | 1628588 A | 6/2005 |
| CN | 107405031 A | * 11/2017 | ........... A47L 7/0085 |

(Continued)

OTHER PUBLICATIONS

International Search Report in Application No. PCT/CN2021/135568.

*Primary Examiner* — Timothy L Maust
(74) *Attorney, Agent, or Firm* — Rosenberg, Klein & Lee (57) ABSTRACT

The cleaning fluid supply system includes a first fluid storage device, a second fluid storage device, a pipeline assembly and at least one fluid drive device, and they are all mounted on the base. The pipeline assembly is provided with a main pipeline, a first branch and a second branch. The main pipeline is configured to supply the cleaning fluid to the cleaning robot. The first branch is communicated with the first fluid storage device, and the second branch is communicated with the second fluid storage device. The first branch and the second branch are both communicated with the main pipeline. The at least one fluid driving device is configured to drive the fluid in the first fluid storage device and the fluid in the second fluid storage device to flow to the first branch and the second branch, respectively.

20 Claims, 9 Drawing Sheets

(56) References Cited

U.S. PATENT DOCUMENTS

| | | | |
|---|---|---|---|
| 6,206,980 B1 | 3/2001 | Robinson | |
| 7,387,681 B2 * | 6/2008 | Matsunaga | B05B 9/047 |
| | | | 118/692 |
| 8,915,269 B2 * | 12/2014 | Krulitsch | B67C 3/206 |
| | | | 141/105 |
| 8,944,120 B2 * | 2/2015 | Neuhauser | B67C 3/02 |
| | | | 141/105 |
| 11,266,286 B2 * | 3/2022 | Letsky | A47L 11/4011 |
| 11,336,069 B2 * | 5/2022 | Ruesch | A47L 11/408 |
| 2009/0236007 A1 * | 9/2009 | Clusserath | B65B 3/26 |
| | | | 141/198 |

FOREIGN PATENT DOCUMENTS

| | | | | |
|---|---|---|---|---|
| CN | 108403020 A | | 8/2018 | |
| CN | 208114567 U | | 11/2018 | |
| CN | 108968835 A | | 12/2018 | |
| CN | 211066435 U | | 7/2020 | |
| CN | 112205930 A | | 1/2021 | |
| CN | 214906356 U | | 11/2021 | |
| CN | 215838774 U | * | 2/2022 | ............ A47L 11/24 |
| KR | 20140036653 A | * | 3/2014 | ............ A47L 11/34 |
| WO | 2022166355 A1 | | 8/2022 | |

* cited by examiner

MAINTENANCE BASE STATION AND CLEANING ROBOT SYSTEM

CROSS-REFERENCE TO RELATED APPLICATIONS

This application is based upon and claims priority to Chinese Patent Application CN 202110163492.6, filed Feb. 5, 2021, the entire contents of which are incorporated herein by reference.

TECHNICAL FIELD

The present application relates to cleaning devices, and more particular to a maintenance base station and a cleaning robot system.

BACKGROUND

With the development of economy and the improvement of living standards, various cleaning robots are widely used in household cleaning, such as sweeping robots, scrubbing robots, or glass cleaning robots. In some cases, the maintenance base station may be used to clean and maintain the cleaning robot. However, the current cleaning fluid supply system for the maintenance base station has a single structure and a low intelligence. Therefore, users have to manually match the proportion of the clear water and the cleaning fluid for cleaning and maintenance, or only add the clear water in that maintenance base station.

SUMMARY

There are provided a maintenance base station and a cleaning robot system according to embodiments of the present disclosure. The technical solution is as below:

According to a first aspect of embodiments of the present disclosure, there is provided a maintenance base station, for maintaining a cleaning robot, comprising:

a base; and
a cleaning fluid supply system comprising:
a first fluid storage device, mounted on the base;
a second fluid storage device, mounted on the base;
a pipeline assembly, mounted on the base, and provided with a main pipeline, a first branch and a second branch, wherein the main pipeline is configured to supply a cleaning fluid to the cleaning robot, wherein an end of the first branch is communicated with the first fluid storage device, and an end of the second branch is communicated with the second fluid storage device, and wherein the other end of the first branch away from the first fluid storage device and the other end of the second branch away from the second fluid storage device are both communicated with an end of the main pipeline; and
at least one fluid driving device, mounted on the base, and configured to drive a fluid in the first fluid storage device to flow to the first blanch and drive a fluid in the second fluid storage device to flow to the second branch.

According to a second aspect of embodiments of the present disclosure, there is provided a cleaning robot system, comprising a cleaning robot and the above-mentioned maintenance base station.

BRIEF DESCRIPTION OF THE DRAWINGS

One or more embodiments are exemplified by the figures in the accompanying drawings. These exemplified descriptions do not constitute a limitation on the embodiments. The elements with the same reference numerals in the drawings are denoted as similar elements. Unless otherwise stated, the figures in the accompanying drawings do not constitute a scale limitation.

DETAILED DESCRIPTION

In order to make the objects, technical solutions, and advantages of the present application clearer, the present application will be further described in detail with reference to the accompanying drawings and embodiments as follows. It should be understood that the specific embodiments described herein are only used to explain the present application, but not used to limit the present application. Based on the embodiments in the present application, all other embodiments obtained by those of ordinary skill in the art without creative work shall fall within the protection scope of the present application.

It should be noted that if there is no conflict, various features in the embodiments of the present application may be combined with each other, and all are within the protection scope of the present application. In addition, although functional modules are divided in the schematic diagram of the device, and the logical sequence is shown in the flowchart, in some cases, the module division in the device may be different, or the sequence of steps shown or described in the flowchart may be different. Furthermore, the terms such as "first", "second" and "third" used in the present application do not limit the data and execution order, but only distinguish the identical or similar items with basically identical function and effect.

Figure 1:
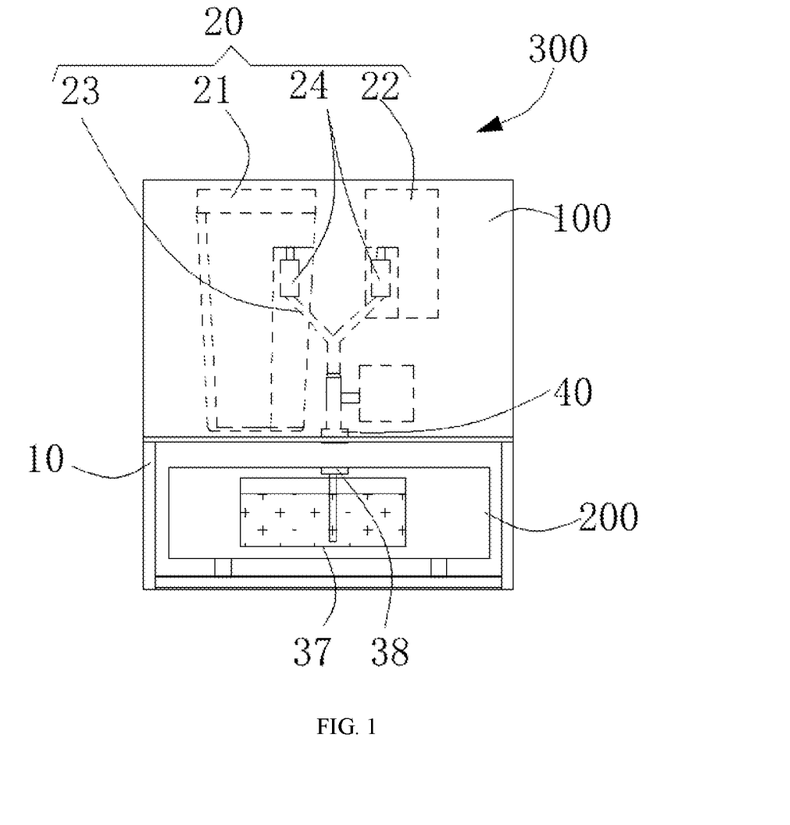
FIG. 1 is a first structural view of a cleaning robot system (corresponding to a first embodiment) according to an embodiment of the present application.
Figure 2:
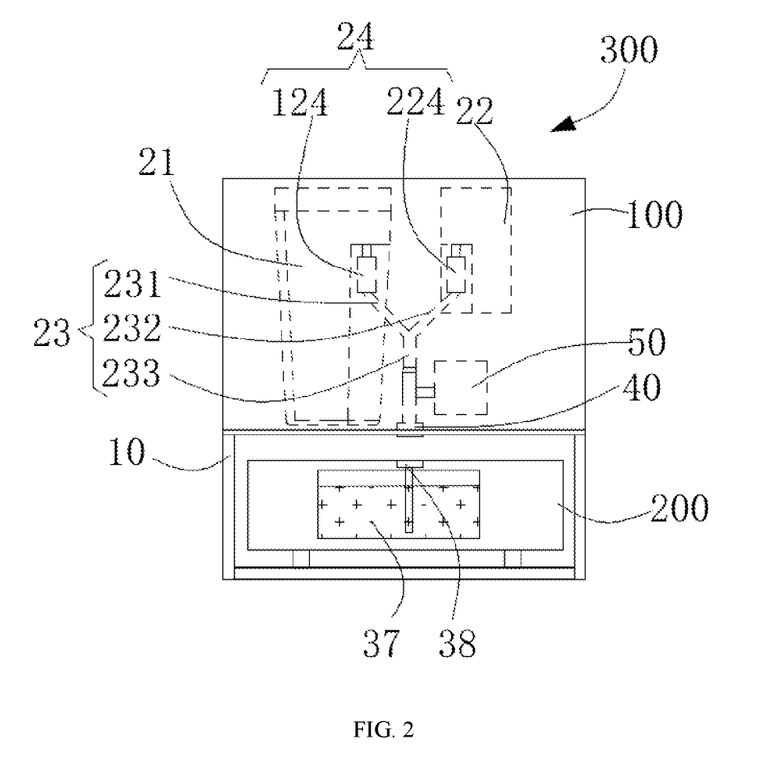
FIG. 2 is a second structural view of the cleaning robot system (corresponding to the first embodiment) according to an embodiment of the present application.
Figure 3:
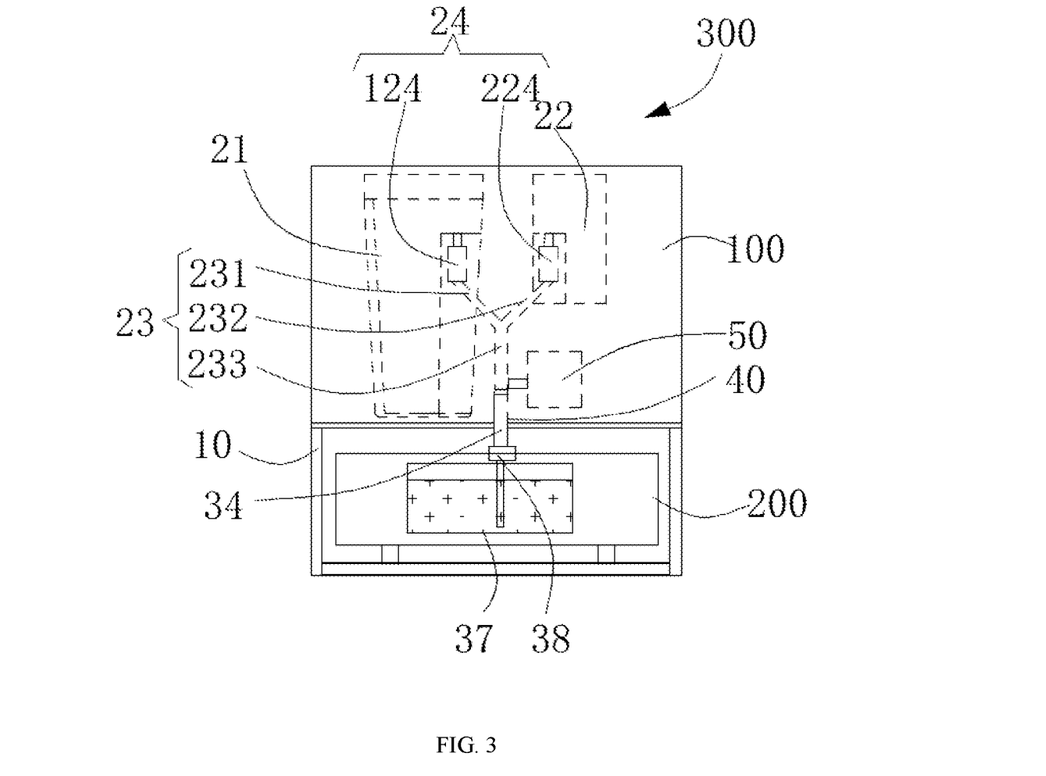
FIG. 3 is a structural view showing that a cleaning robot is docked with a maintenance base station corresponding to FIG. 1.

Referring to FIGS. 1-3, an embodiment of the present application provides a cleaning robot system 300, including a cleaning robot 200 and a maintenance base station 100.

For the cleaning robot 200 provided in the embodiment of the present application, for example, the cleaning robot 200 may be any one of a sweeping robot, an sweeping and mopping integrated robot, and a mopping robot.

Referring to FIGS. 1-3, for the maintenance base station 100 provided in the embodiment of the present application, the maintenance base station 100 is configured to maintain the cleaning robot 200, and includes a base 10 and a cleaning fluid supply system 20. The cleaning fluid supply system 20 includes a first fluid storage device 21, a second fluid storage device 22, a pipeline assembly 23 and at least one fluid driving device 24. The first fluid storage device 21, the second fluid storage device 22 and the at least one fluid driving device 24 are all mounted on the base 10. Both the first fluid storage device 21 and the second fluid storage device 22 may be configured to store the fluid. The pipeline assembly 23 is provided with a main pipeline 233, a first branch 231, and a second branch 232. The main pipeline 233 is configured to supply cleaning fluid to the cleaning robot 200. An end of the first branch 231 is communicated with the first fluid storage device 21. An end of the second branch 232 is communicated with the second fluid storage device 22. The other end of the first branch 231 away from the first fluid storage device 21 and the other end of the second branch 232 away from the second fluid storage device 22 are both communicated with an end of the main pipeline 233. The at least one fluid driving device 24 is configured to drive the fluid in the first fluid storage device 21 to flow to the first branch 231 and drive the fluid in the second fluid storage device 22 to flow to the second branch 232. As an example and not limitation, the first fluid storage device 21 and the second fluid storage device 22 may be a tank for storing fluid or a fluid storage bag for storing fluid.

Different from the traditional art, the first fluid storage device 21, the second fluid storage device 22, and the at least one fluid driving device 24 are all mounted on the base 10, and the pipeline assembly 23 is provided with the main pipeline 233, the first branch 231, and the second branch 232. The main pipeline 233 is configured to supply cleaning fluid to the cleaning robot 200. The main pipeline 233 is communicated with the first fluid storage device 21 through an end of the first branch 231, and is communicated with the second fluid storage device 22 through an end of the second branch 232. The other end of the first branch 231 away from the first fluid storage device 21 and the other end of the second branch 232 away from the second fluid storage device 22 are both communicated with an end of the main pipeline 233, so that the at least one fluid driving device 24 can drive the fluid in the first fluid storage device 21 to flow to the first branch 231 and drive the fluid in the second fluid storage device 22 to flow to the second branch 232, and then they are fully mixed in the main pipeline 233 to form a cleaning fluid with a certain composition ratio. The cleaning fluid supply system 20 of the maintenance base station 100 of the present application can automatically provide cleaning fluid with a certain composition ratio, which is beneficial to meet different degrees of cleaning requirements.

The maintenance base station 100 may provide the mixed cleaning fluid to the cleaning container 37 of the cleaning robot 200 through the cleaning fluid supply system 20.

In this embodiment, the maintenance base station 100 further includes a docking mechanism 40 communicated with the main pipeline 233, which is configured to dock with a docking valve 38 of the cleaning robot 200 to establish a fluid channel 34 for communicating the cleaning container 37 with the main pipeline 233. The cleaning robot 200 is provided with a docking valve 38 for pneumatically communicating the cleaning container 37 with the cleaning container 37. When the cleaning robot 200 moves closer to the maintenance base station 100, the docking valve 38 of the cleaning robot 200 may be docked with the docking mechanism 40, to establish a fluid channel 34 for communicating the cleaning container 37 with the main pipeline 233. The at least one fluid driving device 24 may drive the fluid in the first fluid storage device 21 and the fluid in the second fluid storage device 22 to be transferred to the cleaning container 37 through the fluid channel 34.

Referring to FIGS. 4-6 again, the docking mechanism 40 may be arranged on a longitudinal side of the base 10, so that the docking mechanism 40 may be docked with a circumferential side of the cleaning robot 200. Alternatively, the docking mechanism 40 may be arranged on a bearing surface of the base 10 (for carrying the cleaning robot), so that the docking mechanism 40 may be docked with a bottom of the cleaning robot 200. Alternatively, the docking mechanism 40 may be arranged on an upper surface of the base 10 (opposite to the bearing surface), so that the docking mechanism 40 may be docked with a top of the cleaning robot 200.

Figure 4:
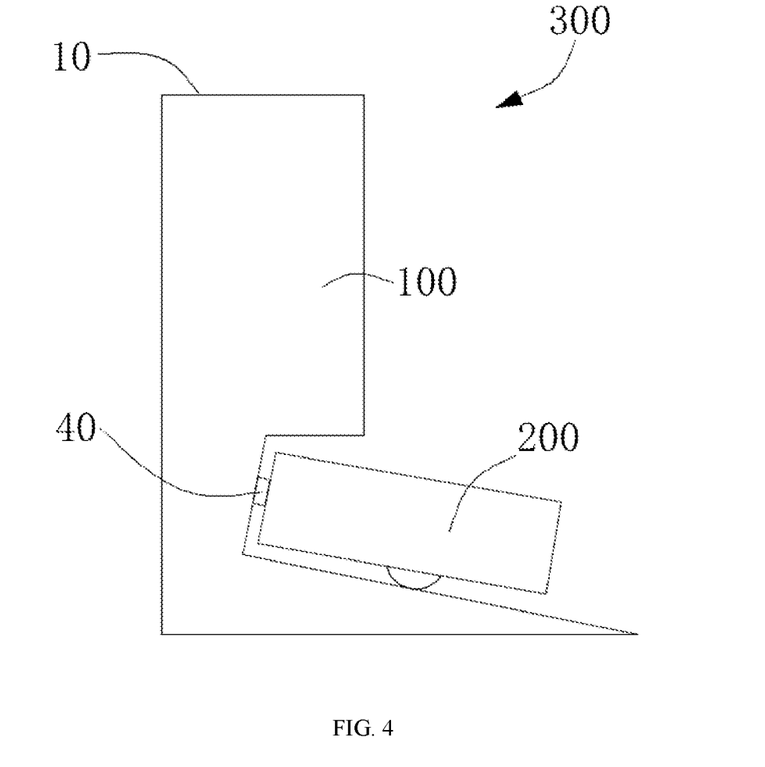
FIG. 4 is a third schematic structural view of the cleaning robot system (corresponding to the first embodiment) according to an embodiment of the present application.
Figure 5:
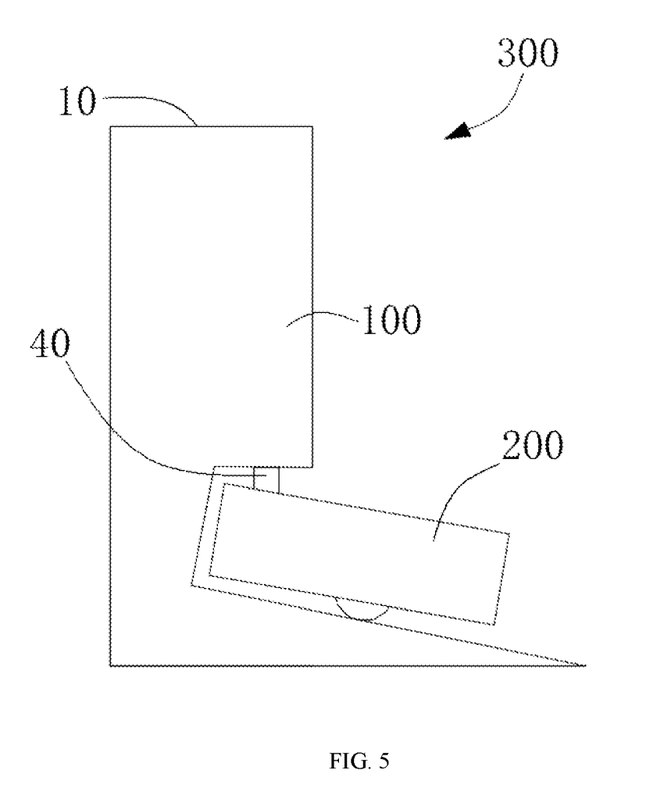
FIG. 5 is a fourth schematic structural view of the cleaning robot system (corresponding to the first embodiment) according to an embodiment of the present application.
Figure 6:
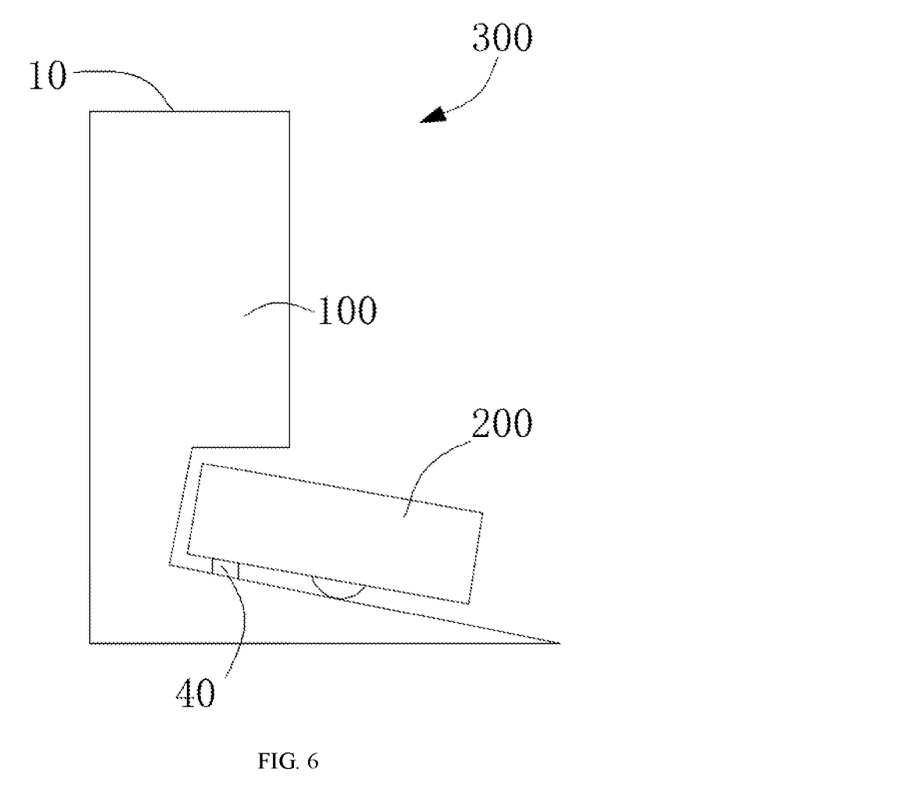
FIG. 6 is a fifth structural schematic view of the cleaning robot system (corresponding to the first embodiment) according to an embodiment of the present application.

The docking valve 38 of the cleaning robot 200 may be a port provided with a one-way valve, or a port provided with a movable cover, which can prevent the fluid in the cleaning container 37 from leaking.

Referring to FIGS. 1-3, in some embodiments, the docking mechanism 40 is telescopically connected to the base 10. The maintenance base station 100 further includes a driving device 50, which is fixed on the base 10, and is drivingly connected to the docking mechanism 40, so that the driving device 50 can drive the docking mechanism 40 to expand or contract relative to the base 10. The driving device 50 can drive the docking mechanism 40 to extend relative to the base 10 to dock with the cleaning robot 200, or contract relative to the base 10 to separate from the cleaning robot 200. The driving device 50 can drive the docking mechanism 40 to expand and contract through any one of a rack and pinion mechanism, a screw mechanism or a link mechanism, which is not limited herein.

In other embodiments, the docking mechanism 40 is fixed on the base 10. When the cleaning robot 200 moves to a preset alignment area, it actively docks with the docking mechanism 40.

In another embodiment, the maintenance base station 100 may provide a mixed cleaning fluid for cleaning and maintaining a part to be cleaned of the cleaning robot 200. In this embodiment, the base 10 is provided with a cleaning groove for accommodating the part to be cleaned of the cleaning robot 200. Apart of the main pipeline 233 is located in the cleaning groove, and the main pipeline 233 may provide a mixed cleaning fluid to the part to be cleaned of the cleaning robot 200, so that the cleaning fluid fully wets the part to be cleaned of the cleaning robot 200, which is beneficial to improve the cleaning effect. The part to be cleaned of the cleaning robot 200 may be a mopping cloth, and the cleaning robot 200 may drive the part to be cleaned to rotate, vibrate or reciprocate, so that the part to be cleaned and a scraping part on the maintenance base station 100 squeeze and rub against each other to achieve a cleaning function. Alternatively, a cleaning device is provided on the maintenance base station 100, and the cleaning device can actively clean the part to be cleaned of the cleaning robot 200 to achieve a cleaning effect.

Referring to FIG. 7 again, in this embodiment, the first fluid storage device 21 and the second fluid storage device 22 are detachably mounted on the base 10. The base 10 is provided with a first mounting groove 11 and a second mounting groove 12. The first mounting groove 11 is configured to accommodate the first fluid storage device 21, and the second mounting groove 12 is configured to accommodate the second fluid storage device 22. For example, by opening a flip cover on the base 10, the user can take out the first fluid storage device 21 from the first mounting groove 11 of the base 10, and take out the second fluid storage device 22 from the second mounting groove 12 of the base 10. In other embodiments, the first fluid storage device 21 may be fixedly connected to the base 10 by means of screw connection, snap connection or pin connection, or the first fluid storage device 21 is integrated with the base 10. The second fluid storage device 22 may be fixedly connected to the base 10 by means of screw connection, snap connection or pin connection. Or, the second fluid storage device 22 is integrated with the base 10.

Figure 7:
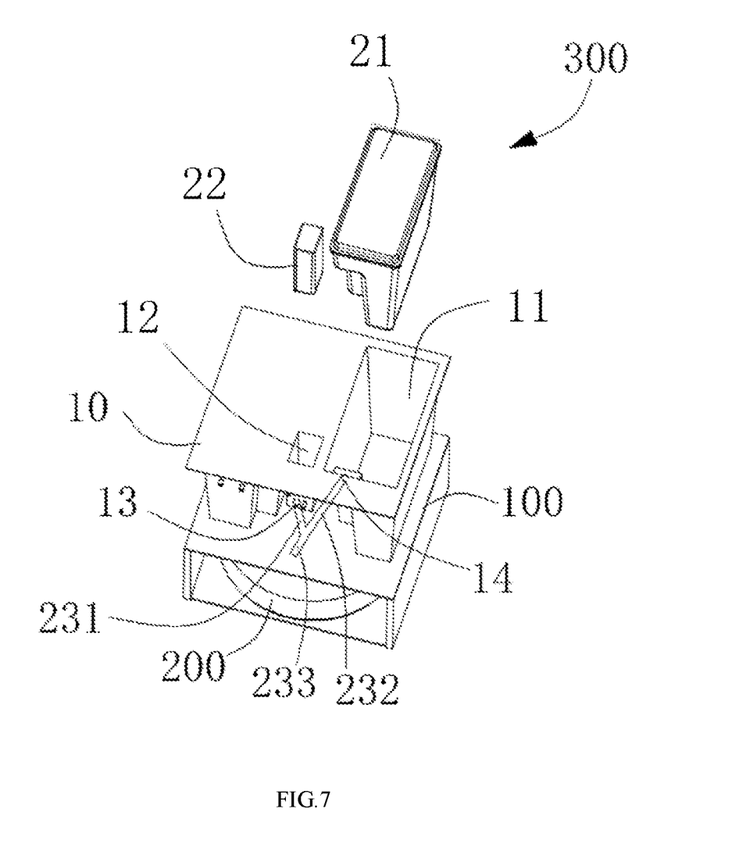
FIG. 7 is a exploded view of the maintenance base station corresponding to FIG. 1.
Figure 8:
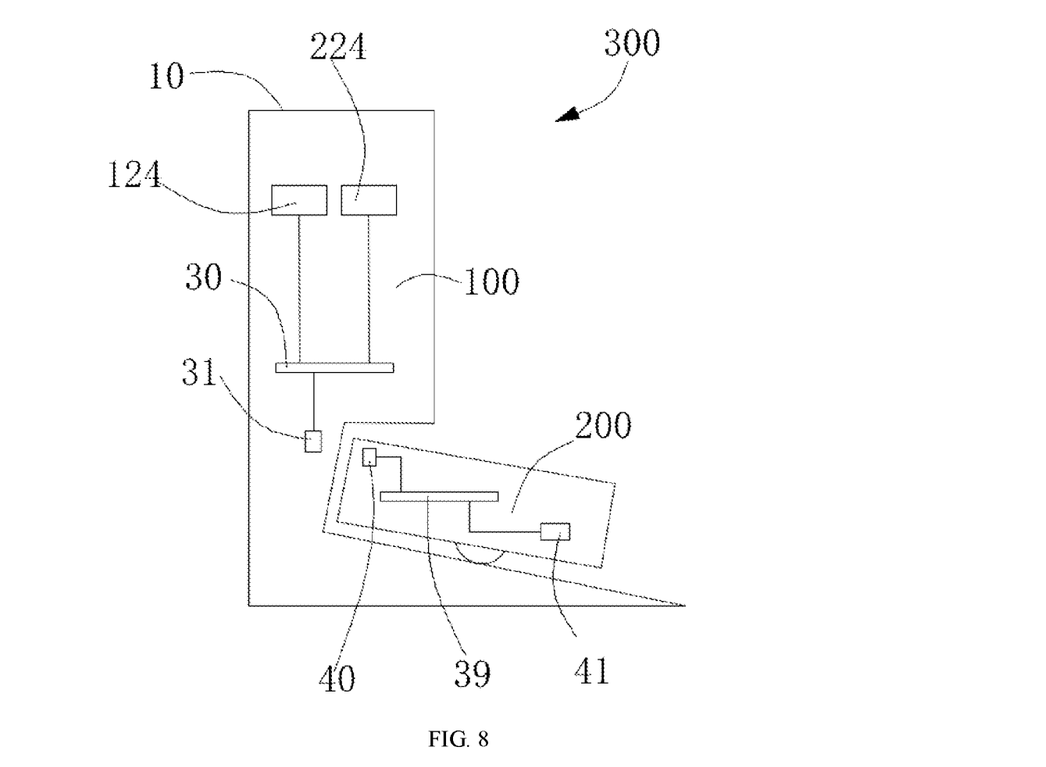
FIG. 8 is a structural view of a hardware of the cleaning robot system according to an embodiment of the present application.

The first fluid storage device 21 is provided with a first inner cavity, a first fluid filling port communicated with the first inner cavity and a first fluid draining port communicated with the first inner cavity. The first fluid filling port and the first fluid draining port both go throughout an inner side wall of the first fluid storage device 21. Water, detergent, disinfectant or other types of cleaning solutions may be added into the first fluid storage device 21 through the first fluid filling port. The first branch 231 is communicated with the first fluid draining port. A sealing cover or a sealing plug may be arranged at the first filling port.

The second fluid storage device 22 is provided with a second inner cavity, a second fluid filling port communicated with the second inner cavity and a second fluid draining port communicated with the second inner cavity. The second fluid filling port and the second fluid draining port both go throughout an inner side wall of the second fluid storage device 22. Water, detergent, disinfectant or other types of cleaning solutions may be added into the second fluid storage device 22 through the second fluid filling port. The second branch 232 is communicated with the second fluid draining port. A sealing cover or a sealing plug may be arranged at the second filling port.

A volume of the first inner cavity and a volume of the second inner cavity may be the same or may be different, which is not limited herein.

The base 10 is provided with a first fluid draining opening 13 at a position corresponding to the first fluid draining port, and the base 10 is provided with a second fluid draining opening 14 at a position corresponding to the second fluid draining port. An end of the first branch 231 is fixedly communicated with the first fluid draining opening 13. The second branch 232 is fixedly communicated with the second fluid draining opening 14. When the first fluid storage device 21 is mounted on the base 10, the first fluid draining port of the first fluid storage device 21 is docked with the first fluid draining opening 13. When the second fluid storage device 22 is mounted on the base 10, the second fluid draining port of the second fluid storage device 22 is docked with the second fluid draining opening 14. It can be understood that a sealing ring may be provided at a junction between the first fluid draining port of the first fluid storage device 21 and the first fluid draining opening 13, and a sealing ring may be provided at a junction between the second fluid draining port of the second fluid storage device 22 and the second fluid draining opening 14, so as to improve the sealing performance.

A groove wall of the first mounting groove 11 is provided with the first fluid draining opening 13 docked and communicated with the first fluid storage device 21. The first branch 231 is communicated with the first fluid storage device 21 through the first fluid draining opening 13. A groove wall of the second mounting groove 12 is provided with the second fluid draining port 14 docked and communicated with the second fluid storage device 22. The second branch 232 is communicated with the second fluid storage device 22 through the second fluid draining opening 14.

Referring to FIGS. 1-3, in the first embodiment, the at least one fluid driving device 24 includes a first fluid driving device 124 pneumatically communicated with the first fluid storage device 21 or the first branch 231, which is configured to drive the fluid in the first fluid storage device 21 to flow to the first branch 231. The first fluid driving device 124 is a first fluid pumping device, and is pneumatically communicated with the first branch 231. The first fluid driving device 124 may be a peristaltic pump or a water pump, which can suck the fluid in the first fluid storage device 21. Alternatively, the first fluid driving device 124 is a first air pump device pneumatically communicated with the first fluid storage device 21, which can input the air into the first fluid storage device 21 to squeeze the fluid in the first fluid storage device 21 into the first branch 231.

The at least one fluid driving device 24 further includes a second fluid driving device 224 pneumatically communicated with the second fluid storage device 22 or the second branch 232, which is configured to drive the fluid in the second fluid storage device 22 to flow to the second branch 232. The second fluid driving device 224 is a second fluid pumping device, and is pneumatically communicated with the second branch 232. The second fluid driving device 224 may be a peristaltic pump or a water pump, which can suck the fluid in the second fluid storage device 22. Alternatively, the second fluid driving device 224 is a second air pump device pneumatically communicated with the second fluid storage device 22, which can input the air into the second fluid storage device 22 to squeeze the fluid in the second fluid storage device 22 into the second branch 232.

The first fluid driving device 124 and the second fluid driving device 224 may work independently. A first flow rate output from the first fluid storage device 21 to the first branch 231 may be adjusted by a working parameter of the first fluid driving device 124. A second flow rate output from the second fluid storage device 22 to the second branch 232 may be adjusted by a working parameter of the second fluid driving device 224. Since the first flow rate and the second flow rate are both adjustable, a composition ratio of the cleaning fluid provided by the cleaning fluid supply system 20 may be adjusted freely, thereby meeting more diverse cleaning requirements.

For example, one of the first fluid storage device 21 and the second fluid storage device 22 is configured to store cleaning water, and the other is configured to store detergent. By adjusting the working parameters of the first fluid driving device 124 and the second fluid driving device 224, the first flow rate and the second flow rate may be adjusted separately, so that the maintenance base station 100 may automatically adjust the ratio of the cleaning water and the detergent. In other embodiments, one of the first fluid storage device 21 and the second fluid storage device 22 is configured to store detergent of a first concentration, and the other is configured to store detergent of a second concentration. The first concentration and the second concentration are not the same.

Of course, in other embodiments, there may be one or more than two fluid driving devices 24, which may be set by those skilled in the art according to practice needs.

Referring to FIGS. 1-3 and 8, in some embodiments, the maintenance base station 100 includes a control circuit board 30 and a first communication component 31 electrically connected to the control circuit board 30. The control circuit board 30 is electrically connected to the at least one fluid driving device 24. The cleaning robot 200 further includes a controller 39 and a second communication component 40 electrically connected to the controller 39.

When the cleaning robot 200 is docked with the maintenance base station 100, the controller 39 controls the second communication component 40 to send preset cleaning fluid demand information to the first communication component 31 of the maintenance base station 100, so the control circuit board 30 determines the working parameter according to the preset cleaning fluid demand information received by the first communication component 31, and controls the at least one fluid driving device 24 to operate according to the working parameter, so that the maintenance base station 100 can reasonably supply a suitable dosage of cleaning fluid for the cleaning robot 200, thereby avoiding the situation of excessive supply or insufficient supply, and effectively improving the supply efficiency.

The first communication component 31 may be any one or a combination of a WiFi module, a Bluetooth module, a Zigbee module, an infrared sensor, an Radio Frequency Identification (RFID) module, and a 2G/3G/4G/4G/5G module.

The second communication component 40 may be any one or a combination of a WiFi module, a Bluetooth module, a Zigbee module, an infrared sensor, an Radio Frequency Identification (RFID) module, and a 2G/3G/4G/4G/5G module.

Referring to FIGS. 1-3 and 8, in this embodiment, the control circuit board 30 is fixed on the base 10, and is electrically connected to the first fluid driving device 124 and the second fluid driving device 224. The first communication component 31 is configured to be communicatively connected to the cleaning robot 200 to obtain preset cleaning fluid demand information. The control circuit board 30 determines the first working parameter and the second working parameter according to the preset cleaning fluid demand information received by the first communication component 31, and controls the first fluid driving device 124 to operate according to the first working parameter, and controls the second fluid driving device 224 to operate according to the second working parameter. When the cleaning robot 200 moves to dock with the maintenance base station 100, the control circuit board 30 determines the first working parameter and the second working parameter according to the preset cleaning fluid demand information. The first working parameter is configured to instruct the first fluid driving device 124 to drive the fluid in the first fluid storage device 21 to deliver to the first branch 231 at the first flow rate, and the second working parameter is configured to instruct the second fluid driving device 224 to drive the fluid in the second fluid storage device 22 to deliver to the second branch 232 at the second flow rate. The first flow rate of fluid and the second flow rate of fluid are mixed in the main pipeline 233, so as to provide the cleaning fluid with a certain ratio matching the preset cleaning fluid demand information for the cleaning robot 200.

In other embodiments, the control circuit board 30 only controls a single fluid driving device 24 for fluid supply.

In some embodiments, the user may set the preset cleaning fluid demand information on a software interface of a smart terminal (smartphone, smart tablet, laptop, etc.). The preset cleaning fluid demand information may be any one or a combination of the total cleaning fluid demand, the composition ratio of the cleaning fluid and cleaning requirement, which is sent to the cleaning robot 200 through a wireless network. The cleaning robot 200 may send the preset cleaning fluid demand information to the maintenance base station 100 through the first communication component 31, so that the maintenance base station 100 may automatically mix the cleaning fluid according to the preset cleaning fluid demand information. For example, the user may set the preset cleaning fluid requirement information including a deep cleaning requirement on a software interface of the smart terminal, and the preset cleaning fluid requirement information may instruct the maintenance base station 100 to mix the cleaning fluid with the first concentration for a cleaning task for the cleaning robot 200, thereby achieving the deep cleaning effect. Alternatively, the user may set the preset cleaning fluid demand information including a moderate cleaning requirement on the software interface of the smart terminal, and the preset cleaning fluid demand information may instruct the maintenance base station 100 to mix the cleaning fluid with the second concentration for the cleaning task for the cleaning robot 200, and the second concentration is less than the first concentration. Alternatively, the user may set preset cleaning solution demand information including a mildness cleaning requirement on the software interface of the smart terminal, and the preset cleaning fluid demand information may instruct the maintenance base station 100 to mix the cleaning fluid with a third concentration for the cleaning task for the cleaning robot 200. The third concentration is less than the second concentration. Therefore, it can not only reduce a residual amount of cleaning fluid in the environment, but also meet the cleaning requirements at the same time.

Referring to FIGS. 1-3 and 8, in other embodiments, the cleaning robot 200 may set the preset cleaning fluid demand information by itself. The cleaning robot 200 includes a water volume detection device 41 configured to detect the water volume state of the cleaning container 37, so that the cleaning robot 200 determines the preset cleaning fluid demand information according to a detection signal of the water volume detection device 41. For example, if the water volume detection device 41 detects that the cleaning container 37 is in a waterless state, the cleaning robot 200 may determine that the supply amount of the cleaning fluid included in the preset cleaning fluid demand information is equal to the capacity of the cleaning container 37. If the water volume detection device 41 detects that the cleaning container 37 is in a half full state, the cleaning robot 200 can determine that the supply amount of the cleaning fluid included in the preset cleaning fluid demand information is half of the capacity of the cleaning container 37. The water volume detection device 41 may be any one of a capacitive water volume detection device, an inductive water volume detection device and an electrode water volume detection device.

Figure 9:
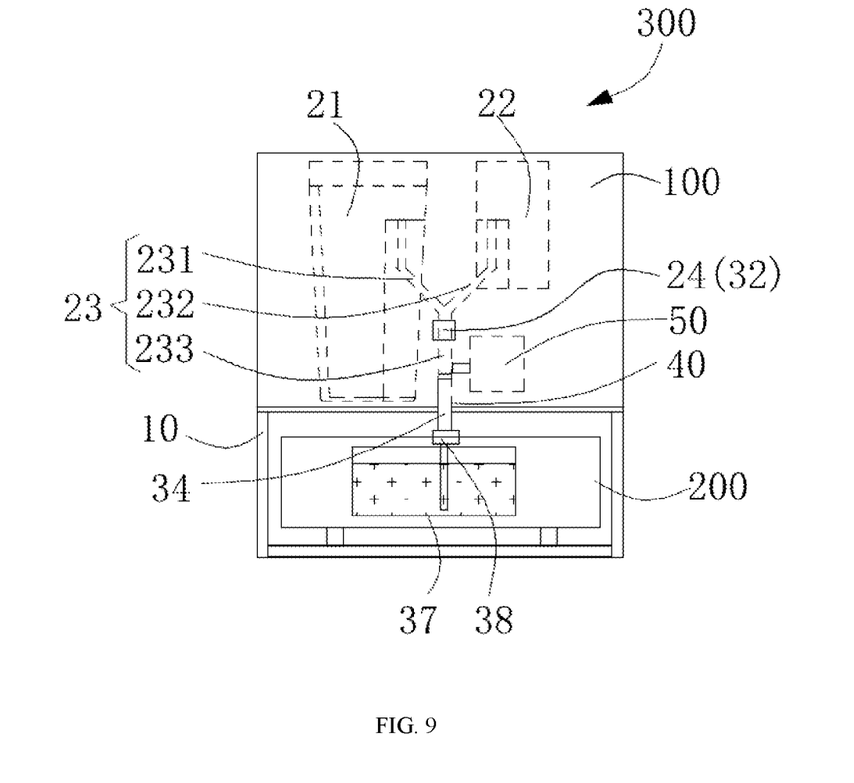
FIG. 9 is a structural view of the cleaning robot system (corresponding to the second embodiment) according to an embodiment of the present application.

Referring to FIG. 9, in the second embodiment, the at least one fluid driving device 24 includes a fluid pumping device 32 pneumatically communicated with the main pipeline 233, which is configured to drive the fluid in the first fluid storage device 21 to flow to the first branch 231 and drive the fluid in the second fluid storage device 22 to flow to the second branch 232. A ratio of a cross-sectional area of the first branch 231 to a cross-sectional area of the second branch 232 meets a preset flow rate ratio of the cleaning fluid. The fluid pumping device 32 may be a peristaltic pump or a water pump, which may generate a suction effect on the fluid in the first fluid storage device 21 and the fluid in the second fluid storage device 22, so that the fluid in the first fluid storage device 21 enters the first branch 231, and the fluid in the second fluid storage device 22 enters the second branch 232.

Finally, it should be noted that the above embodiments are only used to illustrate the technical solutions of the present application, but not to limit the technical solutions of the present application. Under the idea of the present application, the above embodiments or the technical features in different embodiments may also be combined, in which the steps may be implemented in any order, and there are many other changes in different aspects of the application as described above. For the sake of brevity, they are not provided in the details. Although the present application has been described in detail with reference to the foregoing embodiments, those of ordinary skill in the art should understand that they can still modify the technical solutions described in the foregoing embodiments, or make equivalent replacements to some of the technical features. These modifications or replacements do not cause the essence of the corresponding technical solutions to deviate from the scope of the technical solutions of the embodiments of the present application.

What is claimed is:

1. A maintenance base station, adapted to maintain a cleaning robot, comprising:
    a base; and
    a cleaning fluid supply system comprising:
    a first fluid storage device, mounted on the base;
    a second fluid storage device, mounted on the base;
    a pipeline assembly, mounted on the base, and provided with a main pipeline, a first branch and a second branch, wherein the main pipeline is configured to supply a cleaning fluid to the cleaning robot, wherein an end of the first branch is communicated with the first fluid storage device, and an end of the second branch is communicated with the second fluid storage device, and wherein the other end of the first branch away from the first fluid storage device and the other end of the second branch away from the second fluid storage device are both communicated with an end of the main pipeline; and
    at least one fluid driving device, mounted on the base, and configured to drive a fluid in the first fluid storage device to flow to the first branch and drive a fluid in the second fluid storage device to flow to the second branch, wherein a flow from the first branch and a flow from the second branch are mixed in the main pipeline to form a cleaning fluid.

2. The maintenance base station of claim 1, wherein the at least one fluid driving device comprises a first fluid driving device pneumatically communicated with the first fluid storage device or the first branch, which is configured to drive the fluid in the first fluid storage device to flow to the first branch.

3. The maintenance base station of claim 2, wherein the at least one fluid driving device further comprises a second fluid driving device pneumatically communicated with the second fluid storage device or the second branch, which is configured to drive the fluid in the second fluid storage device to flow to the second branch.

4. The maintenance base station of claim 2, wherein the first fluid driving device is a first fluid pumping device, and is pneumatically communicated with the first branch; or the first fluid driving device is a first air pump device, and is pneumatically communicated with the first fluid storage device.

5. The maintenance base station of claim 3, wherein the second fluid driving device is a second fluid pumping device, and is pneumatically communicated with the second branch; or the second fluid driving device is a second air pump device, and is pneumatically communicated with the second fluid storage device.

6. The maintenance base station of claim 3, further comprising:
    a first communication component configured to communicatively connect to the cleaning robot to obtain preset cleaning fluid demand information; and
    a control circuit board, fixed on the base, and electrically connected to the first fluid driving device, the second fluid driving device and the first communication component, wherein the control circuit board determines a first working parameter and a second working parameter according to the preset cleaning fluid demand information received by the first communication component, and controls the first fluid driving device to operate according to the first working parameter, and controls the second fluid driving device to operate according to the second working parameter.

7. The maintenance base station of claim 1, wherein the at least one fluid driving device comprises a fluid pumping device, which is pneumatically communicated with the main pipeline, and is configured to drive the fluid in the first storage device to flow to the first branch and drive the fluid in the second fluid storage device to flow to the second branch, and wherein a ratio of a cross-sectional area of the first branch to a cross-sectional area of the second branch meets a preset cleaning fluid flow ratio.

8. The maintenance base station of claim 1, wherein the base is provided with a first mounting groove and a second mounting groove, and the first fluid storage device is detachably mounted in the first mounting groove and the second fluid storage device is detachably mounted in the second mounting groove, wherein a groove wall of the first mounting groove is provided with a first fluid draining opening docked and communicated with the first fluid storage device, and the first branch is communicated with the first fluid storage device via the first fluid draining opening, and wherein a groove wall of the second mounting groove is provided with a second fluid draining opening docked and communicated with the second fluid storage device, and the second branch is communicated with the second fluid storage device through the second fluid draining opening.

9. The maintenance base station of claim 1,
    the maintenance base station further comprises a docking mechanism communicated with the main pipeline, which is configured to dock with a docking valve of the cleaning robot, to establish a fluid channel connecting a cleaning container of the cleaning robot and the main pipeline.

10. The maintenance base station of claim 9, wherein the docking mechanism is arranged on a longitudinal side of the base, so that the docking mechanism is docked with a circumferential side of the cleaning robot.

11. The maintenance base station of claim 9, wherein the docking mechanism is arranged on a bearing surface of the base, so that the docking mechanism is docked with a bottom of the cleaning robot.

12. The maintenance base station of claim 9, wherein the docking mechanism is arranged on an upper surface of the base, so that the docking mechanism is docked with a top of the cleaning robot.

13. The maintenance base station of claim 9, wherein the docking valve of the cleaning robot is a port provided with a one-way valve or a movable cover, in order to prevent the fluid in the cleaning container from leaking.

14. The maintenance base station of claim 9, further comprising: a driving device fixed on the base, which is drivingly connected to the docking mechanism, so that the driving device is capable of driving the docking mechanism to expand or contract relative to the base.

15. The maintenance base station of claim 1, wherein the base is provided with a first mounting groove configured to accommodate the first fluid storage device and a second mounting groove configured to accommodate the second fluid storage device.

16. A cleaning robot system, comprising:
a cleaning robot; and
a maintenance base station, for maintaining the cleaning robot, comprising:
a base; and
a cleaning fluid supply system comprising:
a first fluid storage device, mounted on the base;
a second fluid storage device, mounted on the base;
a pipeline assembly, mounted on the base, and provided with a main pipeline, a first branch and a second branch, wherein the main pipeline is configured to supply a cleaning fluid to the cleaning robot, an end of the first branch is communicated with the first fluid storage device, an end of the second branch is communicated with the second fluid storage device, and the other end of the first branch away from the first fluid storage device and the other end of the second branch away from the second fluid storage device are both communicated with an end of the main pipeline; and at least one fluid driving device, mounted on the base, and configured to drive a fluid in the first fluid storage device to flow to the first branch and drive a fluid in the second fluid storage device to flow to the second branch, wherein a flow from the first branch and a flow from the second branch are mixed in the main pipeline to form a cleaning fluid.

17. The cleaning robot system of claim 16, wherein the cleaning robot comprises:
a cleaning container; and
a docking valve pneumatically communicated with the cleaning container, which is configured to communicated with the main pipeline of the maintenance base station.

18. The cleaning robot system of claim 17, wherein the maintenance base station comprises a control circuit board and a first communication component electrically connected to the control circuit board, and the control circuit board is electrically connected to the at least one fluid driving device;
the cleaning robot further comprises a controller and a second communication component electrically connected to the controller;
when the cleaning robot is docked with the maintenance base station, the controller controls the second communication component to send a preset cleaning fluid demand information to the first communication component of the maintenance base station, and the control circuit board determines a working parameter according to the preset cleaning fluid demand information received by the first communication component, and controls the at least one fluid driving device to operate according to the working parameter.

19. The cleaning robot system of claim 18, wherein the at least one fluid driving device comprises a first fluid driving device and a second fluid driving device, wherein the first fluid driving device is pneumatically communicated with the first fluid storage device or the first branch, and the second fluid driving device is pneumatically communicated with the second fluid storage device or the second branch, and wherein the control circuit board determines the first working parameter and the second working parameter according to the preset cleaning fluid demand information received by the first communication component, and controls the first fluid driving device to operate according to the first working parameter, and controls the second fluid driving device to operate according to the second working parameter.

20. The cleaning robot system of claim 18, wherein the cleaning robot further comprises a water volume detection device electrically connected to the controller, which is configured to detect a water volume state of the cleaning container, and wherein the controller determines the preset cleaning fluid demand information according to a detection signal of the water volume detection device.

* * * * *